Nov. 16, 1954

W. J. BROWN 2,694,395

PNEUMATIC PRESSURE GARMENT

Filed May 10, 1951

INVENTOR.
William J. Brown
BY Charles Shepard
Attorney

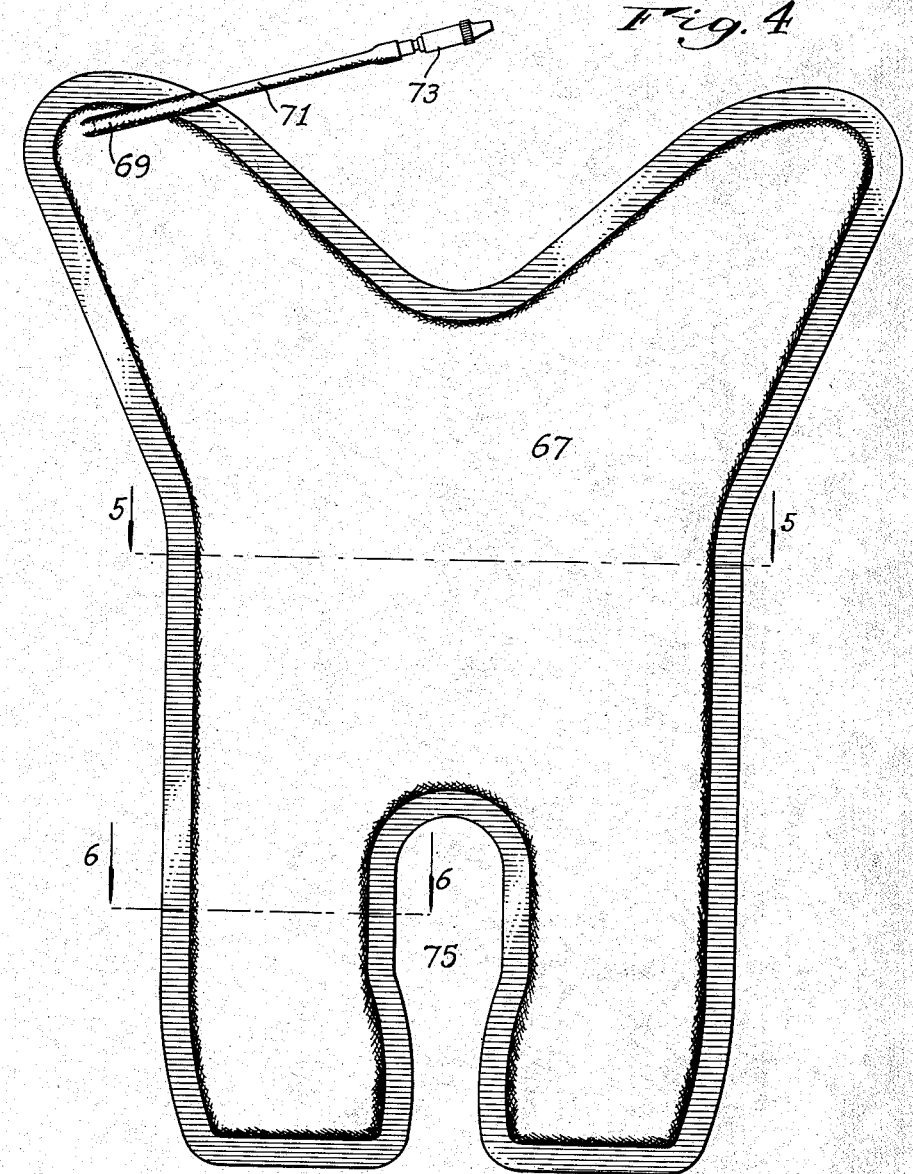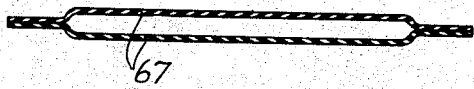

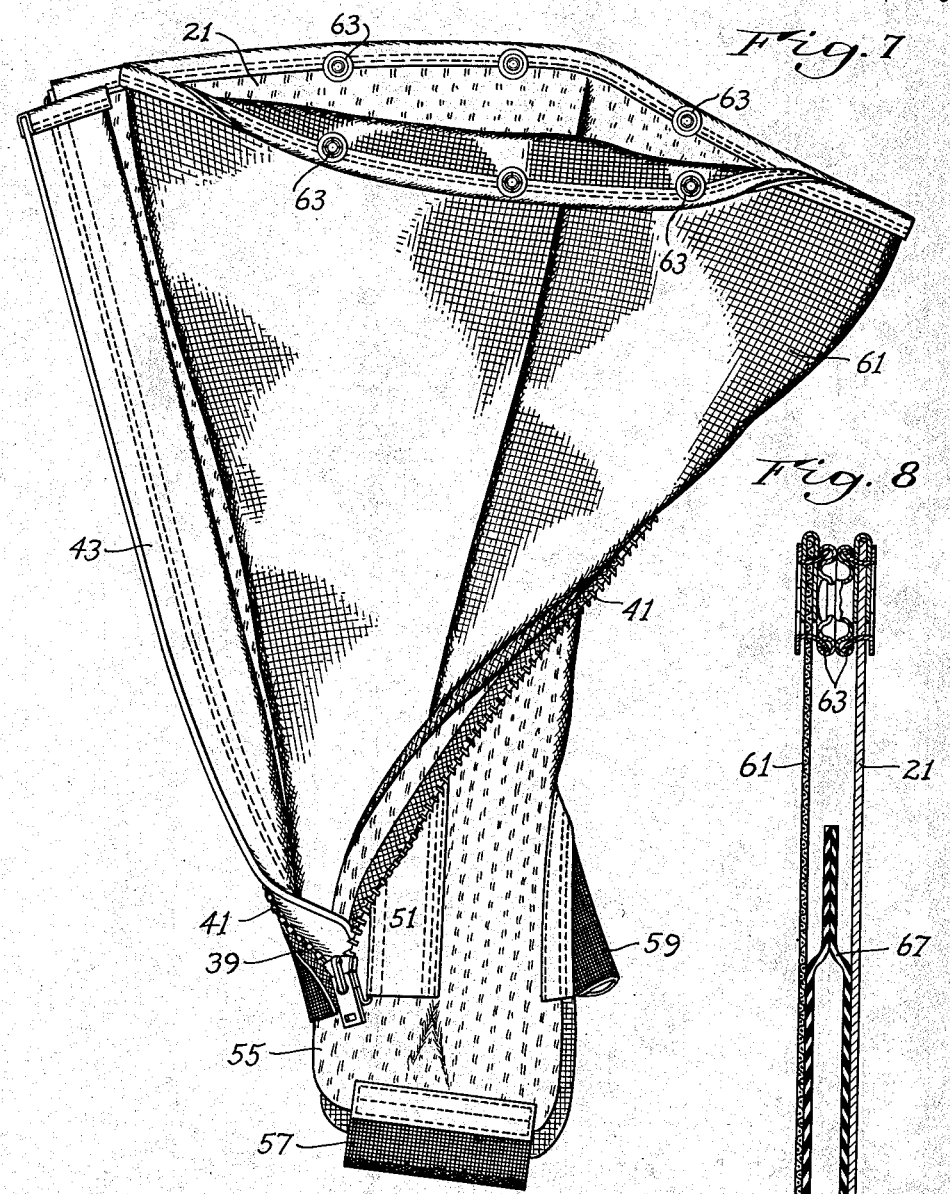

Nov. 16, 1954  W. J. BROWN  2,694,395
PNEUMATIC PRESSURE GARMENT
Filed May 10, 1951  6 Sheets-Sheet 4

INVENTOR.
William J. Brown
BY Charles Shepard
Attorney

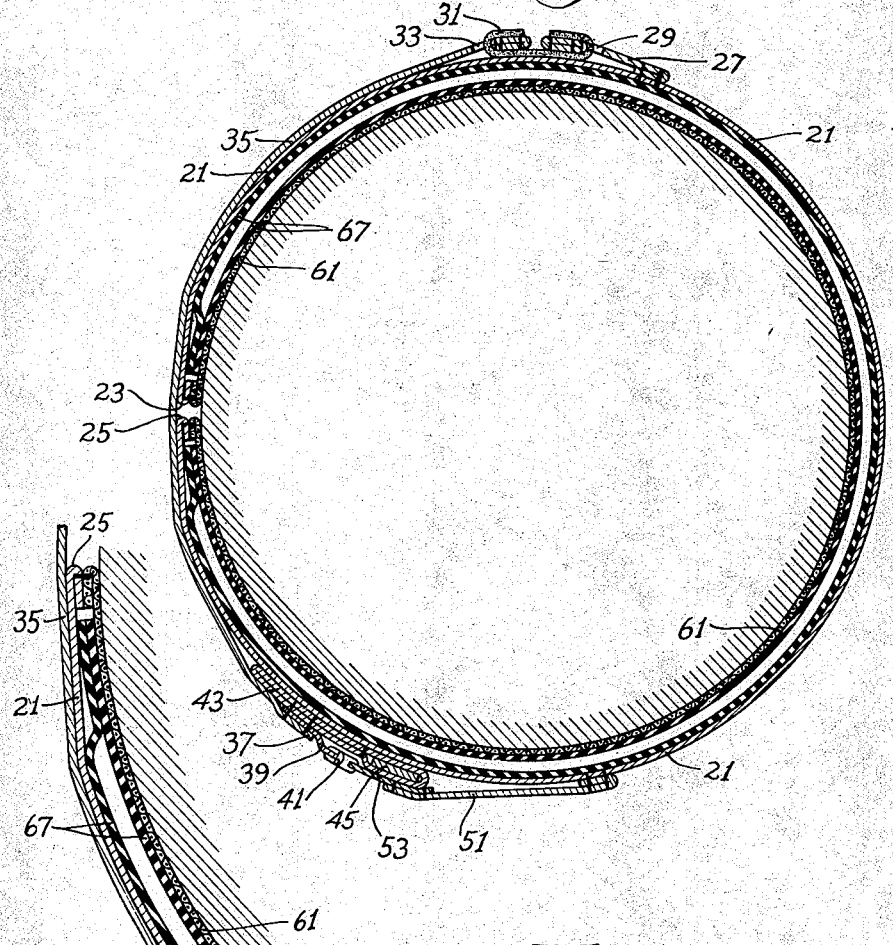
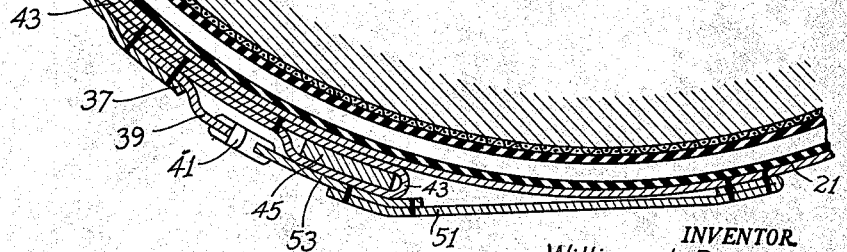

Nov. 16, 1954
W. J. BROWN
2,694,395
PNEUMATIC PRESSURE GARMENT
Filed May 10, 1951
6 Sheets—Sheet 6
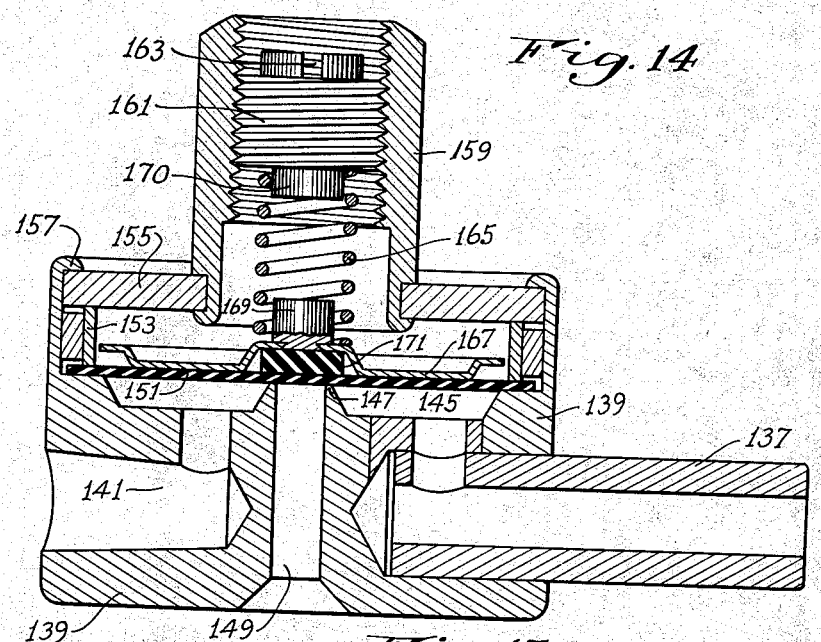
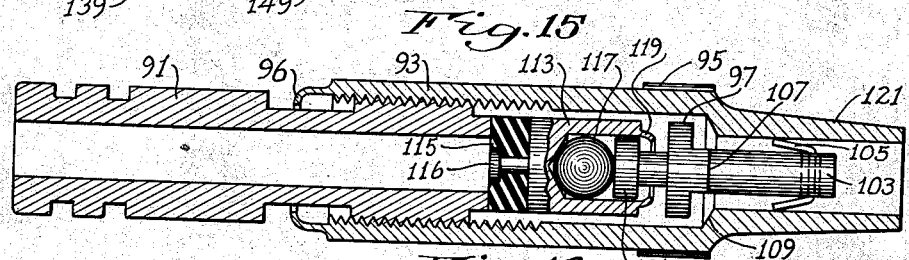
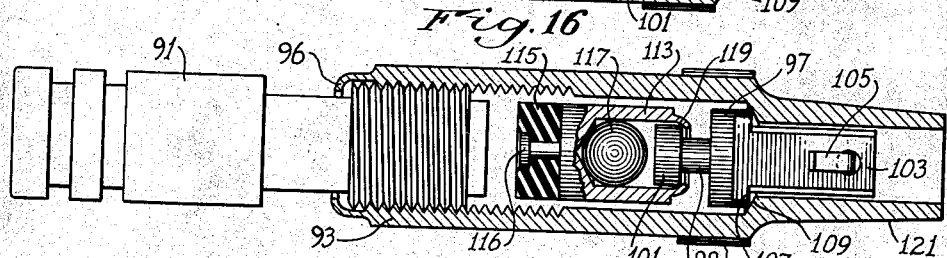
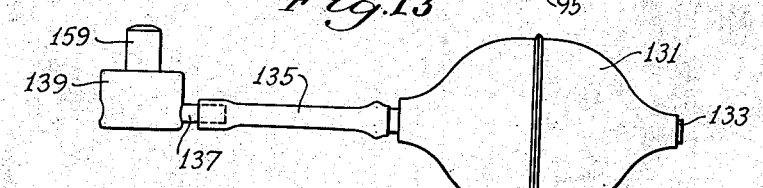
INVENTOR.
William J. Brown
BY Charles Shepard
Attorney

United States Patent Office 2,694,395
Patented Nov. 16, 1954

2,694,395

PNEUMATIC PRESSURE GARMENT

William J. Brown, Albion, N. Y.

Application May 10, 1951, Serial No. 225,640

14 Claims. (Cl. 128—38)

The present invention relates to a pneumatic pressure garment to be worn on the human body to alleviate certain pathological conditions or to effect certain medical or surgical treatment. More particularly, it relates to a garment to be worn in encircling relationship to some part of the human body (such as the leg, for example) designed and constructed so that it will not interfere appreciably with normal active movement of the person wearing the garment, and so that during such normal active movement, it will cause fluctuations or pulsations in the external pressure applied to the skin of the wearer in the pathologically affected area. The garment is especially but not exclusively useful when applied to the lower leg of a person, for the purpose of alleviating skin ulcers in the region of the ankle.

In treating ulcers and similar pathological conditions of the skin, it has heretofore been suggested to subject the affected area to external pressure as by means of an elastic stocking or elastic bandage. Such external pressure is, however, of substantially constant intensity at any one unit of area, but there may be wide accidental and undesirable pressure differences between one area and another area, because of tighter or looser fit of the elastic stocking at different places along the leg, or tighter or looser tension on different convolutions of an elastic bandage. Hence the use of an elastic stocking or an elastic bandage does not produce a readily controllable optimum pressure or range of pressure on the affected part, and does not secure the advantageous results which are believed in some quarters to flow from a substantial variation or pulsation of the external pressure.

It has also been suggested to subject the affected part of the body to variable or pulsating pressure by placing the leg or other affected part within a pneumatic contrivance, the pressure in which is varied by means of a pump or other motor driven mechanism. Because of the bulk and weight of the driving motor and the necessary electric cords or other power supply means for the motor, these variable pressure devices have necessarily been of use only to patients while in bed, or at least while sitting down. So far as is known, there has never heretofore been any practical structure for effectively varying the external pressure on the affected part of the human body, while the person is walking or otherwise moving about in normal pursuits.

An object of the present invention is the provision of simple, efficient, and inexpensive pneumatic means for causing substantial variations or pulsations in external pressure applied to the skin at the affected part of the body.

Another object is the provision of a pneumatic garment so designed and constructed that the normal movements of the wearer, as in walking or other activities, will cause substantial fluctuations or variations in the external pressure applied to the affected part of the body.

Still another object is the provision of a garment of this character, sufficiently small in bulk and light in weight to be easily worn by the patient without discomfort and without being noticeable to observers in the vicinity, and without causing appreciable inconvenience to the wearer or restriction on the wearer's normal movements.

A further object is the provision of a device of this nature, so designed and constructed that it may be easily and quickly put on or taken off by the wearer without assistance from any other person, and may be easily and quickly cleaned when necessary, without damage to any of its parts.

A still further object is the provision of a device capable of producing pressure variations of relatively great magnitude, for use in aggravated pathological conditions.

A still further object is the provision of simple, and substantially fool-proof mechanism for inflating the pneumatic parts to exactly the right degree of pressure, and for retaining the intended pressure in the pneumatic parts, without leakage, until it is purposely desired to release the pressure.

Yet another object is the provision of a garment which may be easily and quickly applied by the wearer himself, without outside assistance, and which will produce on the affected part of the wearer's body exactly the degree of external skin pressure which has been prescribed by the physician, without requiring any expertness in obtaining the desired degree of pressure, the pressure being either static (if so desired by the physician) or subject to pulsations caused by normal bodily movements of the wearer of the garment.

Ulcers and similar pathological conditions of the skin of the leg occur usually but not exclusively in the region of the ankle. When a person walks normally, there is little or no change in the cross sectional area of the ankle; hence if either a plain bandage or an elastic bandage or a pneumatic bandage is applied only around the ankle region, the act of normal walking by the patient will not produce those substantial variations in external pressure on the affected area of the skin which have been found by the medical profession to be beneficial in the treatment of skin ulcers and certain other pathological conditions. According to the present invention, a pneumatic bladder encompasses the pathologically affected region (such as the ankle region) and in addition, it also encompasses some other nearby region of the body which is subjected to pressure variations or to substantial changes in cross sectional area during normal active movements (such as walking movements) of the patient. The calf of the leg is a convenient region for causing pressure variations when moderate but substantial pressure changes are needed, and the sole of the foot is a convenient region for producing greater pressure variations. The bladder is, according to the present invention, relatively thin in radial direction and no larger in area than reasonably necessary to cover the affected area of the skin plus the pressure-pulsation-generating area, so that the bladder will have a relatively small volume of contained air. Also it is externally confined by a inelastic or substantially inelastic envelope, so that any changes in the cross sectional area of the leg embraced by the bladder will result in displacing the inner wall of the bladder radially outwardly toward the outer wall thereof (the outer wall itself being unable to move outwardly because of the substantially inelastic envelope) thus substantially altering the volume of air in the bladder which in turn will cause a substantial variation in the pressure of the air within the bladder, according to Boyle's law which states that so long as temperature is constant, the product of volume times pressure of a gas is constant.

The volume changes in the calf of the leg during normal walking movement by the patient are sufficient to cause substantial pressure variations or pulsations in the bladder, and substantial pressure variation on the ankle of the wearer. In aggravated cases, however, where even greater pressure pulsations are needed, the bladder may, according to another aspect of the invention, be extended downwardly to a point underlying part of the sole of the foot, so that the varying pressure of the sole of the foot against the sole of the shoe, during walking, will compress the air in the bladder and thus cause pulsations of greater magnitude than those obtainable merely by the variations of the cross section of the calf of the leg. This downward extension of the bladder to the region of the sole of the foot may be an integral extension of the same bladder, or may be an operative extension produced by a separate or supplemental bladder in the region of the foot, which separate bladder overlaps the main bladder sufficiently so that pressure fluctuations in the supplemental bladder are effectively transmitted to the main bladder.

These and other desirable objects are accomplished by the construction disclosed as an illustrative embodiment of the invention in the following description and in the accompanying drawings forming a part hereof, in which:

Fig. 4 is a plan of the main pneumatic bladder removed from the rest of the garment;

Fig. 5 is a cross section taken substantially on the line 5—5 of Fig. 4;

Fig. 6 is a cross section taken substantially on the line 6—6 of Fig. 4;

Fig. 7 is a view of the garment shown in Figs. 1 and 2, removed from the leg and partially opened up;

Fig. 8 is a fragmentary vertical section through the top part of the device removed from the leg, showing the snap fasteners and the upper part of the main bladder;

Fig. 11 is a horizontal cross section though the upper part of the structure as applied to a leg;

Fig. 12 is a view similar to a fragment of Fig. 11, on a larger scale;

Fig. 13 is a side elevation of the inflating device;

Fig. 14 is a section taken centrally through the pressure regulator shown at the left end of Fig. 13;

Fig. 15 is a section taken longitudinally through the air valve attached to the bladder, showing it in closed position; and Fig. 16 is a view similar to Fig. 15, showing the valve in open position, with certain parts shown as viewed from a direction at right angles to the direction of Fig. 15.

The same reference numerals throughout the several views indicate the same parts.

Figure 1:
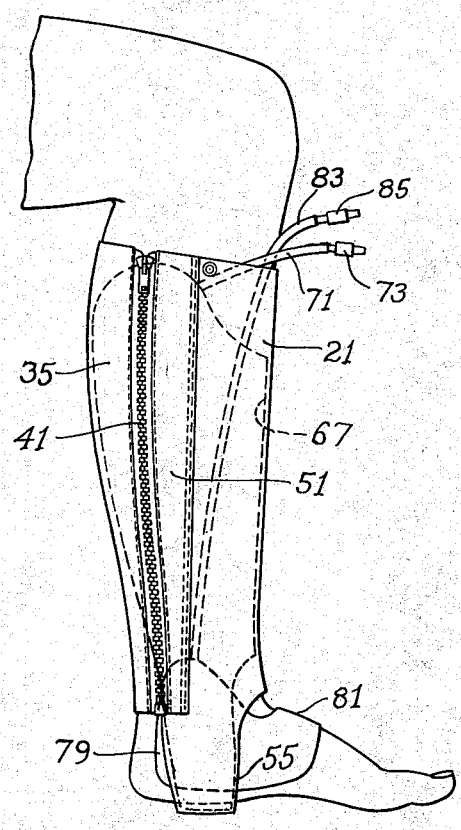
Fig. 1 is a generalized and somewhat diagrammatic side elevation, with certain details omitted, of a preferred form of the present invention as applied to a human leg, viewed with the right side, this form being slightly different from the generally similar form shown in some of the other figures.

Referring now to the preferred embodiment of the invention as disclosed in the drawings, the structure comprises a garment in the general nature of a legging, having a main outer wall 21 made of woven textile fabric of any suitable kind, such as a firm and substantially non-stretchable or inelastic cotton or linen sheet. For convenience of putting it on and taking it off of the leg of the user, this main fabric layer 21 is longitudinally split throughout its entire length, from top to bottom, and is provided with a suitable slide fastener 41 of conventional design. There is preferably also some size adjustment means such as lacing 33, for the purpose of adjusting the circumferential dimensions of the device to the leg of the wearer.

A construction which has been found especially convenient for these purposes is one in which the main fabric layer 21 terminates at the side edges 23 and 25, as seen in Fig. 11. These side edges are closely adjacent to each other but preferably have a slight gap between them so that they do not overlap, overlapping not being seriously objectionable, however, except that it would create a lump or vertical ridge which would ultimately become uncomfortable on the leg of the wearer.

Stitched to the main layer 21 at a point substantially spaced from the edges 23 and 25 is a narrow vertical strip 27 of cloth preferably of the same kind as that used in the main layer 21, which strip 27 is provided near its opposite edge with a vertical series of lacing holes 29. A suitable lacing string, such as a long shoe lace or tape 31 (Figs. 2 and 11) is laced back and forth through the lacing holes 29 and a corresponding series of lacing holes 33 near one edge of another strip of cloth 35, again similar to the cloth 21. This cloth strip 35 extends a substantial distance around the circumference of the leg (see Fig. 11) and terminates at an edge 37 (Figs. 11 and 12) which is sitched to one side tape 39 of the slide fastener 41, and also to a stiffening web 43 of heavier and stiffer cloth, such as light canvas or duck, which itself has a stiffening effect and also is folded so as to enclose an upstanding stiffening bar 45 having approximately the stiffness and rigidity of an old fashioned corset stay of metal or whalebone. The stiffening members 43, 45 extend approximately vertically up the leg of the wearer, and serve the double purpose of insuring that the upper part of the legging will not slide down the leg if it becomes too lose circumferentially, and assisting in holding the slide fastener parts straight and true so that they may be more readily fastened or unfastened.

At another point on the circumference of the main cross member 21, there is stitched thereto, by an approximately vertical line of stitching, one edge of a vertical strip or flap 51, the opposite edge of which is stitched to the tape 53 of the opposite side of the slide fastener 41. This slide fastener is of the type which is completely separable at the bottom of the fastener, after the movable slide has been slid down all the way to the bottom. When it has been thus opened up, the entire legging may be opened from top to bottom and thus may be put on or taken off of the leg conveniently by motion in a lateral direction, rather than by drawing it on or off over the foot as would be the case with a boot.

To hold the legging down and prevent it from riding up the leg accidentally, the two sides of the main cloth piece 21 are extended down the sides of the foot as at 55 (Figs. 1, 2, and 10) and are connected to each other across the sole of the foot, to form a sort of stirrup. This connection preferably is formed by an inserted piece 57 (Figs. 7 and 10) of elastic webbing stitched to the portions 55, so that there is a little give or resilience to the stirrup. At the front of the ankle portion of the legging, just above the instep, the main layer 21 of the cloth may be split upwardly for a short distance and a gusset 59 may be inserted, of elastic webbing or similar resilient material, to give greater comfort to the wearer as his foot tilts upwardly relative to his leg. But except for these elastic portions 57 and 59, of very minor extent, the legging is of substantially inelastic or non-stretching construction, so that it does not expand or contract in a circumferential direction, but rather contains inexpansibly the enclosed pneumatic bladder and the leg of the wearer.

It will be noted from Fig. 11 that the fabric piece 35 overlies and covers the slight gap between the edges 23 and 25 of the main layer 21, and that the slide fastener 41 and the size adjustment means 31 are both offset in a circumferential direction a substantial distance away from the gap 23—25.

The pneumatic bladder is placed within the legging, between the main legging wall 21 and the leg of the wearer. For the dual purpose of spacing the bladder from the skin of the leg, to avoid the cold feeling often associated with a rubber sheet, and also to form a convenient pocket for holding the bladder in place when the legging is being put on or taken off the leg, the legging is preferably provided with a second cloth layer or lining 61 substantially co-terminous with the main layer 21 and stitched to the main layer at its bottom and side edges, but not along the top edge. At the top edge, the main layer 21 and the inner layer or lining 61 are provided with cooperating parts of snap fasteners 63 (Figs. 7 and 8). When these are unfastened, the top edge of the lining layer 61 may be pulled away from the main layer 21 to open the top of the pocket for inserting or removing the rubber bladder. When the bladder has been inserted, the snap fasteners 63 are then snapped together. The lining layer 61 is preferably of a porous or open mesh fabric, having somewhat the character of netting, and considerably lighter than the main structural layer 21.

The various fabric pieces above mentioned are provided at their edges with suitable turned hems, binding tapes, etc., all as indicated diagrammatically in the drawings, but such features may be widely varied, and it is believed that the preferred construction of such parts will be readily understood from a careful study of the drawings without being mentioned in detail.

The bladder itself, which is removably inserted in the pocket between the layer 21 and the lining 61, is best shown in Figs. 4–6, and comprises two sheets 67 of rubber or rubber-like material, with their edges thoroughly cemented to each other in an air tight manner and being elsewhere unconnected to each other. One of these sheets has an air tube connection 69 to which is attached the filling tube 71 and which terminates in a valve 73 of any convenient form for retaining the desired air pressure within the bladder, a preferred form of such valve being described later. This valve may be referred to in general as a retaining valve. The tube 71 is long enough so the valve may project out to a conveniently accessible position for inflation purposes, or it may be tucked down inside the top edge of the legging when inflation is completed. When the legging is worn on the leg in the normal manner, the bladder completely envelops the front and sides of the leg, and there is only a thin strip at the back of the leg which is not covered by the bladder, this being where the split or opening 23—25 in the main structural layer 21 is formed. The shape of the bladder, as shown in Fig. 4, is such that it extends down the side extensions 55 of the legging, well down toward the bottom of the foot. The open space 75 (Fig. 4) in the bladder enables the bladder, like the rest of the legging, to fit over the top of the foot just above the instep, while coming well down the sides of the foot.

The legging is placed on the leg when the bladder is in a deflated condition. When once the legging has been fitted to the individual patient's leg by properly tightening or loosening the lacings 33, it is no longer necessary to touch the lacing 33, subsequent removal or placement of the legging being accomplished merely by fastening or unfastening the slide fastener 41 and opening up the legging and slipping the foot into or out of the stirrup formed by the portions 55 and 57. When the legging has been placed on the leg and the slide fastener has been fastened, the bladder is inflated through the valve 73 to the proper degree, and is worn in this condition throughout the rest of the day, being taken off when the patient goes to bed at night.

The degree of inflation of the bladder depends upon the kind and severity of the pathological condition which is being treated, and other medical factors, and so is subject to some variation from one case to another. In the average case, however, the degree of inflation of the bladder is to a static pneumatic pressure in the neighborhood of 35 millimeters of mercury.

As the patient equipped with this legging takes each step in normal walking, the muscles in the calf of the leg are flexed, thereby making a substantial variation in the cross sectional area of the leg in the calf region. But since the main outer wall 21 of the legging is substantially inelastic, the legging itself cannot stretch circumferentially to accommodate an increase in the cross sectional area of the calf of the leg; hence the increase in the cross sectional area has the effect of forcing the inner wall of the bladder outwardly toward the outer wall of the bladder, thereby compressing the air entrapped in the bladder. This momentary increase in pressure is transmitted, of course, to all of the air in the bladder, so causes a variation or pulsation of the air pressure acting on the skin in a region of the ulcer or other pathological condition, wherever it may be, usually in the region of the ankle. Then during another part of each step, the cross sectional area of the calf part of the leg decreases, allowing the inner bladder wall to move toward the center, away from the outer bladder wall, thus expanding the air in the bladder and decreasing the pressure. These successive pressure pulsations stimulate the flow of lymph and blood through the lymphatic and circulatory systems, in the vicinity of the ulcer or other pathological condition, and thus serve, in many cases, to alleviate the condition somewhat faster than can be done by any other known system which can, as a practical matter, be applied to an ambulatory patient. The entire device is very light and compact, and does not interfere appreciably with the patient's normal movements. For example, a normal average size of legging, equipped with a single bladder, weighs approximately 12 ounces, and is sufficiently thin so that a stocking or sock may be pulled over it without difficulty.

Figure 9:
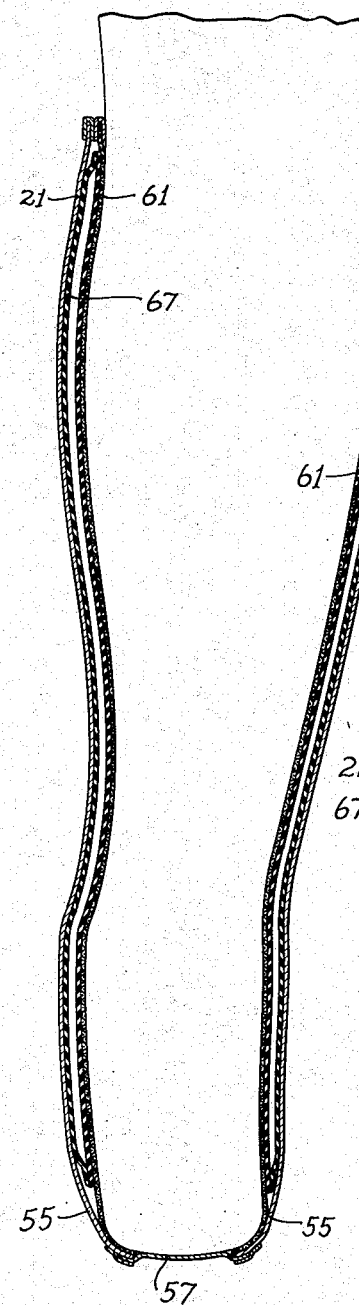
Fig. 9 is a vertical section through the device as applied to the leg, showing the device in its simple form having only one bladder.
Figure 10:
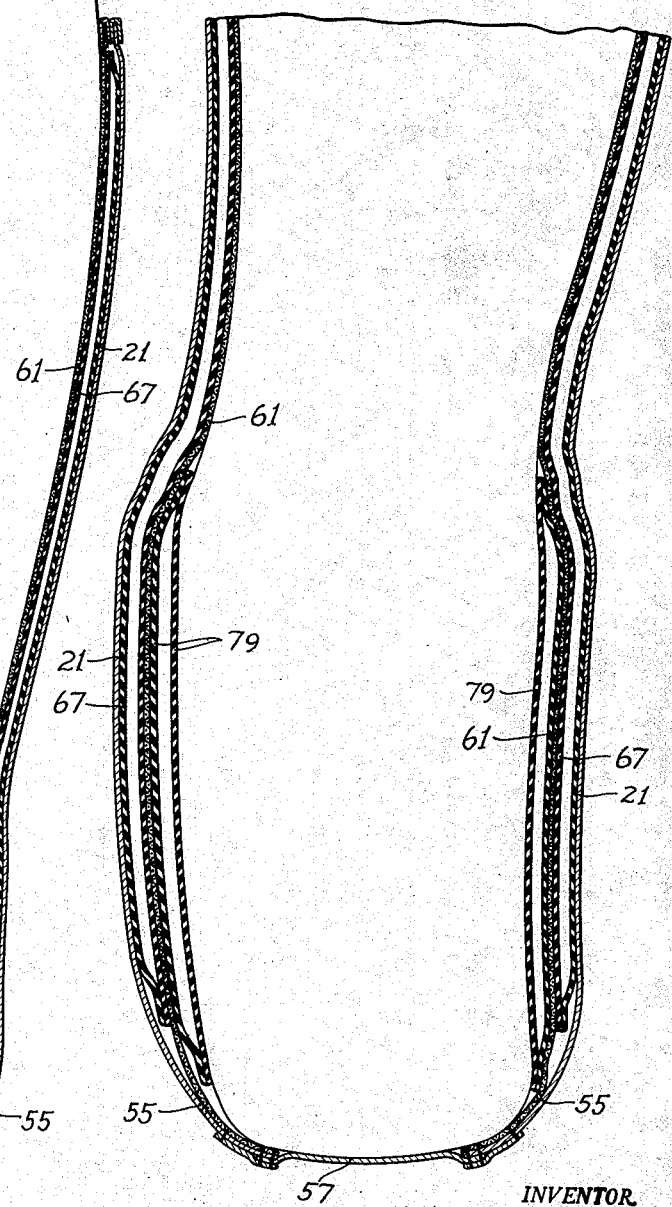
Fig. 10 is a similar view on a larger scale, of the lower part of the structure, showing also the second or supplemental bladder which is used in aggravated cases.

In aggravated pathological cases, where pressure pulsations of greater magnitude may be desirable, the bladder may be extended further downwardly, as already mentioned, so as to obtain some additional pulsation effect from the pressure of the sole of the foot, in conjunction with the pressure pulsations produced by the calf of the leg. The downward extension is preferably formed by a part of the main bladder itself, which extends down far enough to underlie part of the sole of the foot, as indicated diagrammatically in Fig. 1, so that every step taken by the wearer serves to compress this underlying part of the bladder. By making this underlying part of relatively large area, quite substantial pressure pulsations are secured. When the pressure pulsations derived from the calf of the leg are sufficient and pulsations from the sole of the foot are unnecessary, the bladder need not extend under the sole of the foot but may stop somewhat above the sole, as indicated in Figs. 9 and 10.

Figure 2:
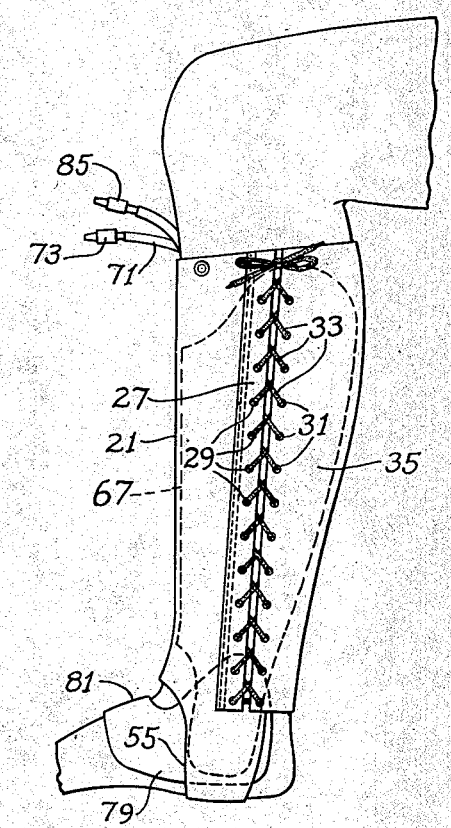
Fig. 2 is a similar view from the left side.
Figure 3:
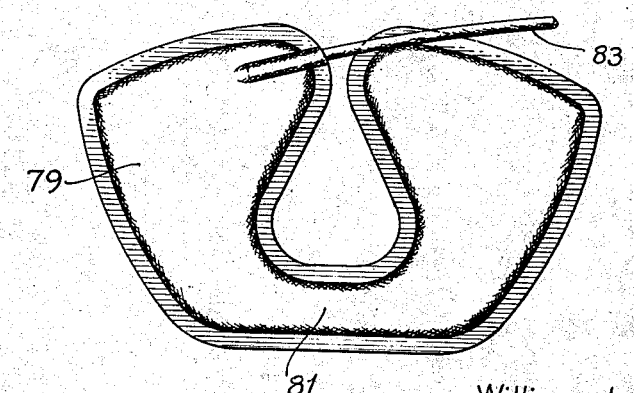
Fig. 3 is a plan of the supplemental pneumatic bladder removed from the rest of the garment.

For alleviation of some pathological conditions, it is desirable to apply a different (usually higher) degree of pressure to the skin at the lower extremity of the leg, than that applied higher up. This is done by employing a second or supplementary bladder at the bottom of the leg, which may be inflated to a different pressure. The second bladder may conveniently be in the form shown in Fig. 3, formed as before of two walls 79 of rubber or rubber-like composition securely cemented to each other around the edges. This form of bladder has somewhat the shape of a pair of water wings. The narrow connecting part 81 goes over the instep as seen in Figs. 1 and 2, while the main wings of the bladder lie at the sides of the foot extending well down toward the sole of the foot and well below the region of the malleola bones. It is frequently below this bone that the physician desires to apply a higher degree of pressure. Pulsations of pressure in the supplementary bladder are obtained, either by extending part of the supplementary bladder under the foot, or preferably by overlapping the supplementary bladder with the main bladder throughout a sufficiently large area (as shown in Figs. 1, 2, and 10) so that some part of the pressure pulsations of the main bladder are transmitted to the supplementary bladder.

The inflating tube 83 of the supplemental bladder is a relatively long one, long enough to extend all the way up the legging, inside it, to an accessible position at the top. As before, there is a valve 85 at the end of the tube 83. The valve and the end of the tube are tucked into the top of the legging whenever they are not needed for inflation purposes.

The supplemental bladder 79 is preferably placed on the foot first; then the legging is placed on the foot, over the supplemental bladder and its inflating tube 83. The supplemental bladder may be inflated to the same degree as or a lesser degree than the main bladder, but preferably is inflated, as above stated, to a slightly higher pressure. For example, if the main bladder 67 is inflated to a pressure of 35 millimeters of mercury, the supplementary bladder 79 may conveniently be inflated to a pressure of about 50 millimeters of mercury. The supplemental bladder is useful in treating pathological skin conditions on the foot or at the extreme lower part of the leg, in positions which can not be covered easily by the main bladder.

In very mild cases, where very little pressure variation or pulsation is needed, the main body fabric of the legging may be made of elastic webbing (similar to an elastic stocking) instead of the substantially non-stretchable material 21 above mentioned. When the outer covering or envelope is of elastic webbing, it will stretch a little when the cross sectional area of the leg increases at the calf, and thus there will be less compression of the air within the bladder, and a lesser magnitude of pressure pulsations, than would occur with the preferred form of inelastic covering or enveloping material. But the elastic form may in some cases have the advantages of fitting the leg more closely and of being somewhat thinner and more sightly, causing less bulging of an overlying stocking, so that it is more acceptable to a female patient, and thus will be more satisfactory for those cases where the pathological condition is very mild.

Turning now to the valves 73 and 85 at the ends of the tubes 71 and 83, these may conveniently and preferably be of the construction shown in Figs. 15 and 16. Each valve comprises a tubular metal stem or body 91 having one end adapted to be tightly fastened inside the end of the inflation tube (71 or 83, as the case may be) and having the other end externally screw-threaded to receive an internally threaded sleeve 93 having a knurled part 95 by which it may be conveniently turned, and an inwardly spun flange 96 to limit the extent to which the sleeve 93 may be unscrewed. The sleeve 93 is tubular throughout its length. Mounted somewhat floatingly within it is a stud 97 having an inwardly extending reduced shank 99 with an enlarged head 101 at the inner end of the shank, and also having, at the other end of the stud, an outwardly extending shank 103 which is flattened on two opposite sides as seen in Fig. 15. A springy metal stirrup 105 extends through a transverse hole formed in the shank 103 approximately perpendicular to the flattened sides thereof, and has its ends bent over as shown in Fig. 15, to rub frictionally against the inner walls of the bore of the sleeve 93. Thus, as the sleeve 93 is turned in an unscrewing direction relative to the main tubular shank 91, the stud 97 will be drawn outwardly with the sleeve 93, away from the tubular valve body 91, by reason of the friction between the member 105 and the sleeve 93. When the sleeve 93 is screwed onto the valve body 91, however, then the sleeve 93 will push the stud 97 back toward the valve shank 91, due to the engagement of the shoulders 107 on the stud 97 with the shoulder 109 on the sleeve 93. But even when these shoulders are engaged, there will still be an air passageway past the stud 97, because the shoulders 107 are cut away at two opposite sides, as seen in Fig. 15.

Between the left end or inner end of the stud 97 and the end of the valve body 91, there is a cup-shaped member 113 having its open end faced outwardly toward the stud 97, and having at its inner or left end a flat surface with a soft rubber gasket or washer 115, held in place by a headed pin or screw 116. In the opening within the cup-shaped member 113 is a hardened metal ball 117. The right end or outer end of the member 113 projects beyond the head 101 on the stud 97 and has a thin flange which is spun inwardly as at 119, to a diameter greater than that of the shank 99 but less than that of the head 101 of the stud 97. Because of this spun flange 119, the head 101 will pull outwardly or rightwardly on the cup-shaped member 113 when the sleeve 93 is unscrewed, and thus will pull the entire assembly consisting of the parts 113—119 in an outward or rightward direction away from the valve body 91, opening the valve. It will be noted that the cup-shaped member 113 and washer 115 are quite loose within the sleeve 93, leaving plenty of space around them for passage of air.

When it is desired to close the valve, the sleeve 93 is screwed tightly onto the valve stem or body 91, so that the shoulder 109 on the sleeve 93 presses against the shoulders 107 on the stud 97, and the inner end of the head 101 of this stud presses tightly against the ball 117 and thus presses the member 113 leftwardly to seat the gasket 115 firmly against the flat end of the valve stem or body 91, closing the valve in an exceptionally air-tight manner. The use of the ball 117 interposed between the head 101 and the cup-shaped member 113 provides an almost frictionless contact between these parts so that, as soon as the gasket 115 comes in contact with the end of the valve stem, further rotation of the sleeve 93 may rotate the stud 97 without causing further rotation of the gasket 115, although it will tighten the pressure on the gasket. Since there is no further rotation of the gasket, there will be merely direct pressure without sliding or rubbing of the gasket on the end of the valve stem, so that the gasket will last a long time and will not wear out as rapidly as it would if it were rotated while closing pressure was being applied.

Both of the valves 73 and 85 on the two tubes 71 and 83 may be of the same construction described with reference to Figs. 15 and 16. In both cases, when it is desired to inflate the bladder to which the valve is attached, the sleeve 93 is unscrewed a few turns and then the outer tapered end 121 of the sleeve is inserted tightly in a correspondingly tapered socket of any suitable source of compressed gas, and gas is allowed to flow in through the tubular sleeve 93, past the open valve gasket 115, into the valve stem 91, and through the rubber tube into the bladder. While thus flowing in, it does not escape appreciably between the stem 91 and the sleeve 93, because the mating threads on these parts have a reasonably tight fit with each other, though not necessarily completely air tight.

When the proper degree of inflation has been attained, the sleeve 93 is turned to screw the valve down to a tightly closed condition, which can be done without damage to the gasket because of the non-rotating gasket feature above mentioned.

Inflation may be accomplished by connecting the valve to a compressed gas cylinder or any other suitable supply of compressed air or other compressed gas. Preferably, however, the patient is provided with a small hand pump having a built-in pressure regulator, the pump and regulator together being small enough to be conveniently carried in a man's pocket or a woman's handbag, for use whenever required. For example, the pump may be of the familiar rubber bulb type embodying a rubber bulb 131 (Fig. 13) adapted to be squeezed by the fingers, the bulb having the usual air inlet check valve (not shown) at one end as indicated diagrammatically at 133, the other end of the bulb being connected by the rubber tube 135 to an inlet nipple 137 extending into the regulating valve body 139. Referring now to Fig. 14, the valve body is provided, diametrically opposite the inlet nipple 137, with a socket or recess 141 having a slight taper for receiving the correspondingly tapered end 121 of the sleeve 93 of the valve 91 shown in Figs. 15 and 16, which represents either one of the valves 73 and 85 shown in Figs. 1 and 2. The socket 141 and the inlet nipple 137 both communicate, by means of lateral passages, with the annular passage or chamber 145 which surrounds an annular valve seat 147 formed by a fairly sharp annular edge, almost but not quite a knife edge. A relief passage 149 extends through the valve body 139 and is surrounded at its inner end by the annular valve seat 147 just mentioned.

A rubber diaphragm 151 extends across the valve seat 147 and the annular chamber 145, and has its edges tightly cramped against the valve body by a clamping ring 153 held in place by a disk 155, the edges of which are overlain by a turned over or staked down flange 157 on the main valve body 139. An internally threaded tube 159 is fixed to and rises from the center of the disk 155, and is axially alined with the relief passage 149. Threaded within the sleeve 159 is an adjusting plug 161 having a screwdriver slot 163 by which the plug may be screwed farther in or out of the screw threads of the sleeve 159, to adjust the force on a coiled compression spring 165 which reacts against the adjusting plug 161 and presses downwardly on a metal disk 167 which overlies the rubber disk or diaphragm 151. An upstanding stud 169 on the disk, together with a depending projection 170 on the adjusting plug 161, enter the interior of the coiled spring to hold the spring accurately centered on these parts. The center of the metal disk 167 is dished upwardly as well seen in Fig. 14, to provide space for receiving, between it and the diaphragm 151, a resilient rubber block 171 of an area somewhat larger than the valve seat 147.

Whenever the air pressure in the annular chamber 145 (which is connected both to the pump bulb 131 and, through the valve 91, to the bladder which is being inflated) rises above a predetermined amount, it will displace the diaphragm 151 outwardly away from the valve seat 147, against the force of the spring 165, and thus will allow air to escape from the chamber 145 to the relief port or opening 149. As soon as the pressure in the chamber 145 (and, of course, in the bladder which is in communication therewith) is lowered to the predetermined pressure for which the relief valve is set, the diaphragm 151 will be forced by the spring 165 back into contact with the valve seat 147, so that further escape of air through the relief port 149 is prevented. The degree of pressure at which the relief port will open may be adjusted by screwing the plug 161 in or out. The supplemental resilient block 171 is provided in order to insure an even sealing pressure around the entire periphery of the annular seat 147, even if, due to manufacturing inaccuracies, the valve seat is not entirely true or perfect.

In practice, the bladder may be inflated, assuming that the end of the bladder valve is seated in the socket of the regular valve, by continuing the pumping on the pump bulb 131 until the air begins to escape from the relief port 149. It is then known that the pressure in the bladder has reached the desired amount for which the regulator valve is set, and pumping may be discontinued, whereupon the sleeve 93 of the bladder valve is screwed tight to close the bladder valve, and is removed from the tapered socket of the regulator valve. But in actual practice it is often found that the slight sound of air escaping through the relief port 149 may not be noticed by the person operating the pump, so it is usually preferred, in most cases, to hold the regulator valve in one hand and keep one finger over the outlet end of the relief port 149, while operating the pump bulb 131 with the fingers of the other hand. Then pumping is continued for a long enough time (which the person soon learns by actual experience) to make sure that the bladder is pumped up to a pressure somewhat above the intended final pressure. Then pumping is discontinued, and the finger is removed from the relief port 149, whereupon air will issue from the relief port until only the desired degree of pressure is left in the bladder, whereupon the bladder valve is screwed up tight as before. Then the end of the bladder tube with the tightened valve is tucked down inside the top edge of the legging, and the patient is ready to start the day's activities, freely able to walk about or do whatever other normal occupation is desired. Upon retiring at night, the legging is removed from the leg and laid aside, and the patient goes to bed in the normal way, putting the legging on again in the morning. The bladder may be deflated (by opening the bladder valve) either before or after taking it off the leg.

In case two different bladders are used, a single air pump may be supplied to the patient if both bladders are to be inflated to the same pressure. But if different pressures are to be used in the two bladders, two different pumps are provided (which is not inconvenient, because the entire pump and regulating valve is very small) and each pump has its regulating valve set for the proper pressure to be applied to one of the bladders. Conveniently, each pump may be colored differently from the other, and the colors used on the pumps may correspond to colors on the ends of the tubes 71 and 83 attached to the respective bladders, so that the patient will not make any mistake as to which pump to use in inflating which bladder.

The pneumatic pressure garment has been described, in its preferred form, as a legging to be worn on the leg of a person having a pathological condition of the skin of the leg, because skin ulcers and similar ailments are likely to occur in the ankle region of the leg, so that a garment in the form of a legging is an excellent example of the use of the present invention. It will be apparent, however, that the invention may be applied also to other parts of the body and is not necessarily confined to usefulness on the lower leg. In order to obtain the beneficial pressure pulsations, on whatever part of the body the pathological condition exists, the bladder is extended from the affected part to some other part of the body which, during normal movement of the patient, changes its shape or size sufficiently to cause the necessary compression of the bladder to produce the pressure pulsations to be transmitted to the affected pathological area. Since the calf of the leg is a convenient part of the body to use to obtain the pressure pulsations, this part may be used for that purpose even though the affected or pathological area is at some distance removed from the calf of the leg, one or more pressure-transmitting tubes being run from the pulsation-creating part of the bladder at the calf of the leg to the treatment part of the bladder at the affected area of the body. Parts of the body other than the calf of the leg may, of course, be used to produce the pressure pulsations, provided such other parts are moved frequently during the expected activities of the patient.

It is to be understood that the foregoing disclosure is given by way of illustrative example only, rather than by way of limitation, and that without departing from the invention, the details may be varied within the scope of the appended claims.

What is claimed is:

1. The combination of a fabric envelope adapted to encompass a part of the human body, flexible walled pneumatic bladder means disposed within said envelope and adapted to lie between it and the body, said fabric envelope being provided both with separable fastening means for holding the envelope in encompassing relation to the part of the body to which it is adapted to be applied, and with size adjusting means for adjusting the size of the envelope to the size of the body part to which it is adapted to be applied, an inflation tube operatively connected to said bladder means, a manually operable retaining valve for controlling flow of air into and out of said tube, thereby to control the degree of fluid pressure retained within said bladder means and said inflation tube, and means controlled by normal movements of the wearer for causing pulsations of pressure within said bladder means while said retaining valve is closed.

2. The combination according to claim 1, in which said separable fastening means is a slide fastener and in which said size adjusting means comprises adjustable lacing.

3. The combination of a fabric envelope adapted to encompass a part of the human body, flexible walled pneumatic bladder means adjacent said envelope and adapted to lie between the envelope and the body and adapted to extend from a pathologically affected part of the body to a non-affected part of the body producing greater variation in pressure upon the surface of the bladder during normal activity of the wearer than the pressure variations produced by the affected part of the body, so that the pressure variations produced by the non-affected part of the body will cause pneumatic pressure pulsations in said bladder means, an inflation tube operatively connected to said bladder means, and a manually operable retaining valve for controlling flow of air into and out of said tube, thereby to control the degree of fluid pressure retained within said bladder means and said inflation tube.

4. The combination according to claim 3, in which said portion of said bladder means adapted to extend from one part of the body to another is an integral extension of a single bladder.

5. The combination according to claim 1, in which said bladder means is adapted to extend from a pathologically affected part of the body to a non-affected part of the body capable of producing pressure pulsations in the bladder means by normal movements of said non-affected part by normal activity of the wearer.

6. The combination according to claim 5, in which said bladder means is adapted to extend to a position partially underlying the sole of the foot.

7. The combination according to claim 6, in which said portion of said bladder means adapted to extend from one part of the body to another is an integral extension of a single bladder.

8. The combination according to claim 1, in which said fabric envelope includes a main layer and a lining layer forming a pocket between them, and in which said bladder means is at least mainly located within said pocket.

9. The combination of a flexible and substantially non-stretchable envelope adapted circumferentially to encircle the lower leg of a wearer from the ankle region upwardly through at least a substantial part of the calf of the leg, a lining layer of material lighter and more flexible than that of said envelope located within said envelope and permanently fastened thereto along at least one edge and detachably fastened thereto along another edge to form an accessible pocket between said envelope and said lining layer, and flexible walled pneumatic bladder means removably mounted in said pocket and confined thereby, said bladder means being adapted to extend from the ankle region to the calf region of the leg.

10. The combination of a flexible envelope adapted circumferentially to encircle the lower leg of a wearer from the ankle region upwardly through at least a substantial part of the calf of the leg, a flexible walled pneumatic bladder within said envelope and confined thereby, said bladder being adapted to extend from the ankle region to the calf region of the leg, and a second flexible walled pneumatic bladder located partly within said envelope in the region of the lower part of the ankle and side of the foot of the wearer.

11. The combination according to claim 10, in which the two bladders are inflated to different pneumatic pressures.

12. The combination according to claim 11, in which the second bladder is inflated to a higher pneumatic pressure than the first bladder.

13. The combination according to claim 10, in which the two bladders overlap each other throughout a common area of substantial size.

14. The combination of flexible air-tight bladder means having one portion adapted to be located under the bottom of the foot of a wearer so that at each walking step of the wearer said portion will be subjected to varying external pressure to vary the pneumatic pressure within said portion of said bladder means, said bladder means having another portion adapted to be located in overlying relation to a pathologically affected part of the leg of the wearer above the foot, said two portions of the bladder means being in free communication with each other and the volume of said bladder means being sufficiently small with relation to the magnitude of variation of external pressure on the bladder means so that the act of normal walking will produce substantial pneumatic pressure variations in said other portion of said bladder means, and bladder retaining means including an external layer of flexible and substantially non-stretchable material enveloping said bladder means and adapted also to envelope the leg of the wearer and an internal layer of lighter and more flexible material forming a lining between said bladder means and the leg of the wearer, said external layer and said internal layer forming between them a pocket receiving said bladder means, separable fasteners uniting said internal layer to said external layer along one side of said pocket so that said pocket may be opened to remove said bladder means when said retaining means is to be washed, and other fastening means uniting said internal layer to said external layer along other sides of said pocket.

References Cited in the file of this patent

UNITED STATES PATENTS

| Number | Name | Date |
|---|---|---|
| 451,179 | Ware | Apr. 28, 1891 |
| 1,013,731 | Benkiser | Jan. 9, 1912 |
| 1,629,108 | Lake | May 17, 1927 |
| 2,280,025 | Bollinger | Apr. 14, 1942 |
| 2,440,608 | Hunter | Apr. 27, 1948 |
| 2,493,406 | Hicks | Jan. 3, 1950 |

FOREIGN PATENTS

| Number | Country | Date |
|---|---|---|
| 16,644 | Great Britain | of 1906 |
| 440,113 | Germany | Sept. 16, 1925 |
| 549,294 | Great Britain | Nov. 13, 1942 |